(12) United States Patent
Suzuki et al.

(10) Patent No.: US 9,145,970 B2
(45) Date of Patent: Sep. 29, 2015

(54) CONTROL DEVICE FOR AUTOMATIC TRANSMISSION

(71) Applicant: Suzuki Motor Corporation, Hamamatsu-shi, Shizuoka-ken (JP)

(72) Inventors: Kazuhiko Suzuki, Shizuoka (JP); Shoji Yagi, Shizuoka (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 61 days.

(21) Appl. No.: 13/935,997

(22) Filed: Jul. 5, 2013

(65) Prior Publication Data

US 2014/0011633 A1    Jan. 9, 2014

(30) Foreign Application Priority Data

Jul. 9, 2012   (JP) ................. 2012-153249

(51) Int. Cl.
| | |
|---|---|
| F16H 61/08 | (2006.01) |
| F16H 61/68 | (2006.01) |
| F16H 61/682 | (2006.01) |
| F16H 61/04 | (2006.01) |
| F16H 59/68 | (2006.01) |
| F16H 61/28 | (2006.01) |

(52) U.S. Cl.
CPC ............ *F16H 61/68* (2013.01); *F16H 61/0437* (2013.01); *F16H 61/2807* (2013.01); *F16H 61/682* (2013.01); *F16H 2059/6807* (2013.01); *F16H 2061/0474* (2013.01); *F16H 2061/2823* (2013.01); *Y10T 477/638* (2015.01)

(58) Field of Classification Search
CPC .............................................. F16H 2061/0474
USPC ............................................ 477/124; 74/335
See application file for complete search history.

(56) References Cited

U.S. PATENT DOCUMENTS

| | | | | |
|---|---|---|---|---|
| 4,603,596 | A * | 8/1986 | Akashi et al. ............... | 74/336 R |
| 5,910,068 | A * | 6/1999 | Krauss et al. ................ | 477/109 |
| 6,658,950 | B2 | 12/2003 | Yamamoto ................... | 74/336 R |
| 6,884,200 | B2 * | 4/2005 | Shimaguchi .................. | 477/124 |
| 2002/0053248 | A1 | 5/2002 | Yamamoto ................... | 74/336 R |
| 2003/0183032 | A1 | 10/2003 | Shimaguchi ................. | 74/336 R |
| 2013/0151094 | A1 * | 6/2013 | Steinhauser et al. ........... | 701/60 |

FOREIGN PATENT DOCUMENTS

| | | |
|---|---|---|
| CN | 101334109 A | 12/2008 |
| DE | 10 2010 002 592 A1 | 9/2010 |
| FR | 2 837 555 A1 | 9/2003 |
| JP | S 58-184323 A | 10/1983 |
| JP | 2002-147590 A | 5/2002 |
| JP | 2010-203586 | 9/2010 |
| WO | WO 2006/074621 A1 | 7/2006 |

OTHER PUBLICATIONS

Chinese Office Action dated Apr. 23, 2015, issued to Chinese Application No. 201310286694.5.

* cited by examiner

*Primary Examiner* — Sherry Estremsky
(74) *Attorney, Agent, or Firm* — Stein IP, LLC (57) ABSTRACT

There is provided a control device for an automatic transmission configured to automatically shift a transmission of a driving force of a motor in response to a driving state. The automatic transmission includes a synchromesh mechanism configured to couple gear pairs and a rotary shaft to transmit the driving force of the motor to the gear pairs and a switching apparatus configured to switch a coupling state of the gear pairs and the rotary shaft. A preload control unit is configured to operate the switching apparatus to apply a preload to the synchromesh mechanism when a shift transmission request is detected. A shift control unit is configured to operate the switching apparatus to apply a shift load greater than the preload to the synchromesh mechanism after the preload is applied to the synchromesh mechanism.

2 Claims, 10 Drawing Sheets

FIG. 14 Related-Art

CONTROL DEVICE FOR AUTOMATIC TRANSMISSION

CROSS-REFERENCE TO RELATED APPLICATIONS

The disclosure of Japanese Patent Application No. 2012-153249 filed on Jul. 9, 2012, including specification, drawings and claims is incorporated herein by reference in its entirety.

BACKGROUND OF THE INVENTION

1. Field of the Invention

The invention relates to a control device for an automatic transmission, and more particularly, to a control device for an automatic transmission capable of performing a process from a shift transmission starting to a shift transmission completion in a short time.

2. Description of the Related Art

An automatic transmission is provided with a plurality of gear pairs (input shaft-side gear and output shaft-side gear) of a constant mesh type between a rotary shaft of an input-side and a rotary shaft of an output-side, a synchromesh mechanism for switching the gear pairs between a power transmission state and a power non-transmission state by using an actuator, and a switching apparatus for applying a load to the synchromesh mechanism by the actuator and to switch a coupling state of the gear pairs and the rotary shafts. In the related art, a control device for the automatic transmission operates the synchromesh mechanism by the switching apparatus and to shift the automatic transmission to a desired shift transmission ratio.

In the control device for the automatic transmission, an automatic clutch is applied for power transmission between an engine that is a motor and the automatic transmission. If a shift disengagement operation for switching the gear pairs of the transmission starts immediately at the time of releasing the automatic clutch upon shift transmission control, a torsional vibration occurs in the rotary shafts due to the automatic clutch being released. Thus, the meshing force of the gear pairs is increased, so that it is not possible to perform the shift disengagement. Consequently, a shift stroke becomes stagnant.

In order to solve the above problem, according to Patent Document 1, torque at the input shaft-side of the transmission and torque at the output shaft-side of the transmission are detected and starting time of the shift disengagement is set so that the shift is disengaged at timing at which the torques are balanced.

Patent Document 1: Japanese Patent Application Publication No. 2010-203586A

According to Patent Document 1, however, since the starting time of the shift disengagement is determined based on the timing at which the torque at the input shaft-side and the torque at the output shaft-side are balanced, the balance time of the torques may be late. In this case, the starting time of the shift disengagement is delayed and the time from a shift transmission starting to a shift transmission completion is prolonged. Thereby, even in a driving situation where the acceleration or deceleration is necessary, the shift transmission is not rapidly made, so that the mileage or operability may be deteriorated.

Figure 14:
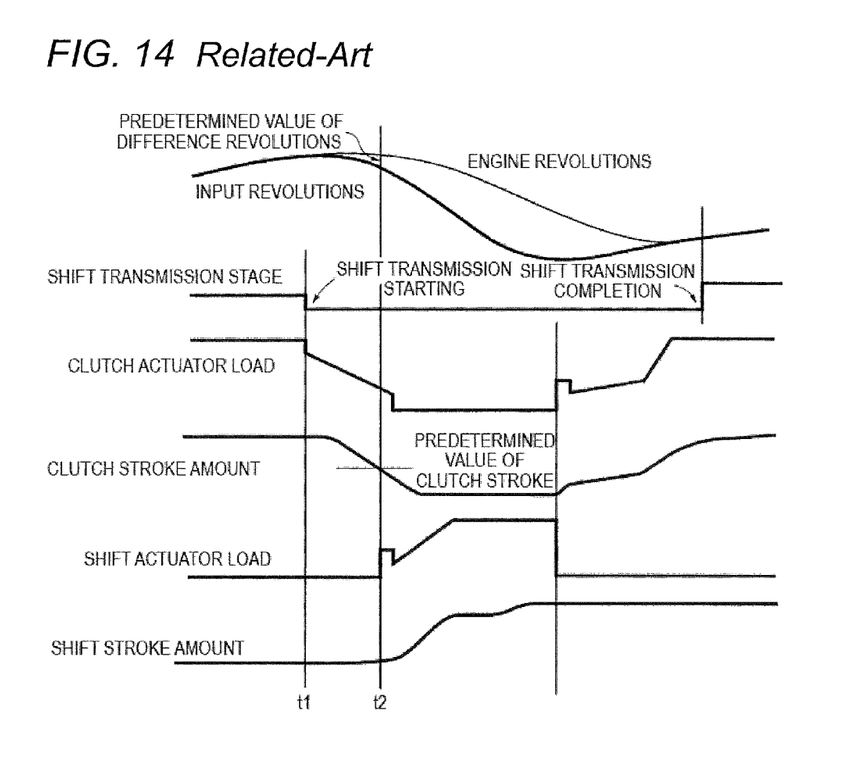
FIG. 14 is a timing chart of shift transmission control.

Also, according to the related art control device for the automatic transmission, as shown in FIG. 14, the shift transmission control starts to thus operate a clutch actuator of the automatic clutch (t1) and a shift actuator is operated at a time point at which the automatic clutch is released to some extent (at a time point at which a clutch stroke reaches a predetermined value or at a time point at which a difference between the number of revolutions of the rotary shaft at the input-side and the number of revolutions of the rotary shaft at the output-side reaches a predetermined value) (t2), so that the shift disengagement operation of the gears starts. In this case, since the clutch release operation (t1) and the shift disengagement operation (t2) are performed with being temporally-deviated, the shift transmission time is prolonged. As a result, even in the driving situation where the acceleration or deceleration is necessary, the shift transmission is not rapidly made, so that the mileage or operability may be deteriorated.

SUMMARY OF THE INVENTION

It is therefore an object of the present invention is to provide a control device for an automatic transmission capable of suppressing vibrations upon shift transmission and performing a rapid shift transmission.

Accordingly, in order to achieve the above object, according to an aspect of the embodiments of the present invention, there is provided control device for an automatic transmission that automatically shifts a transmission of a driving force of a motor in response to a driving state and includes: a rotary shaft; a plurality of gear pairs provided on the rotary shaft; a synchromesh mechanism configured to couple the gear pairs and the rotary shaft to transmit the driving force of the motor to the gear pairs; and a switching apparatus configured to apply a load to the synchromesh mechanism by an actuator to switch a coupling state of the gear pairs and the rotary shaft when a shift transmission request is detected, the control device comprising: a preload control unit configured to operate the switching apparatus to apply a preload to the synchromesh mechanism when the shift transmission request is detected, and a shift control unit configured to operate the switching apparatus to apply a shift load greater than the preload to the synchromesh mechanism after the preload is applied to the synchromesh mechanism.

According to the above configuration, when a shift transmission request is detected, the preload is applied to the synchromesh mechanism by the preload control. The coupling of the gear pairs and the rotary shaft is gradually released by the synchromesh mechanism during the preload control. When the coupling of the gear pairs and the rotary shaft is loosened, the shift load greater than the preload is applied to the synchromesh mechanism by the shift control.

That is, when the shift transmission request is detected, the low load is applied in the preload control to thus release a little the coupling state of the gear pairs and the rotary shaft by the synchromesh mechanism, thereby reducing torsional load that would be applied to the rotary shaft of the automatic transmission. After that, the predetermined time has elapsed and the torsional load has been reduced upon the execution of the shift control. Therefore, it is possible to reduce the vibrations occurring when the coupling of the gear pairs and the rotary shaft is released by the synchromesh mechanism. Also, the preload is applied, so that the time necessary to reach a target load for performing the shift control is shortened. Thereby, it is possible to shorten the time necessary for the shift change.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1A:
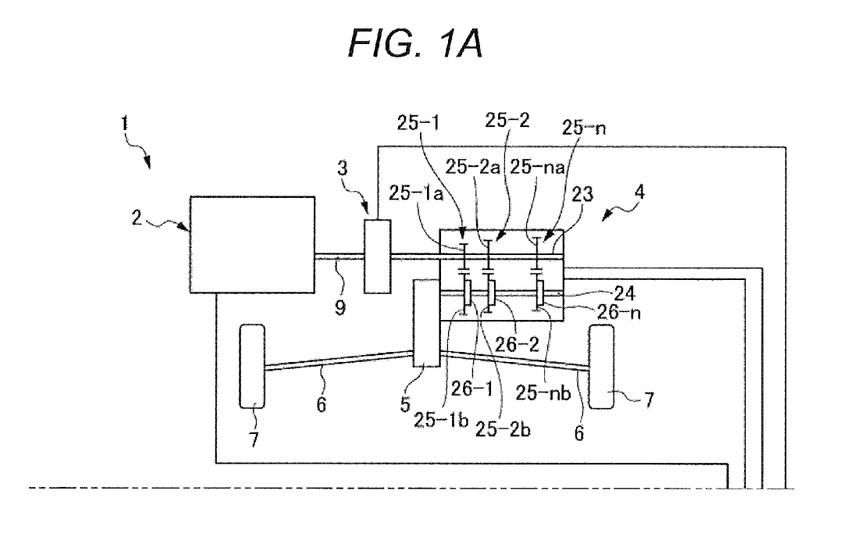
FIGS. 1A and 1B show a system configuration of a control device for an automatic transmission.
Figure 1B:
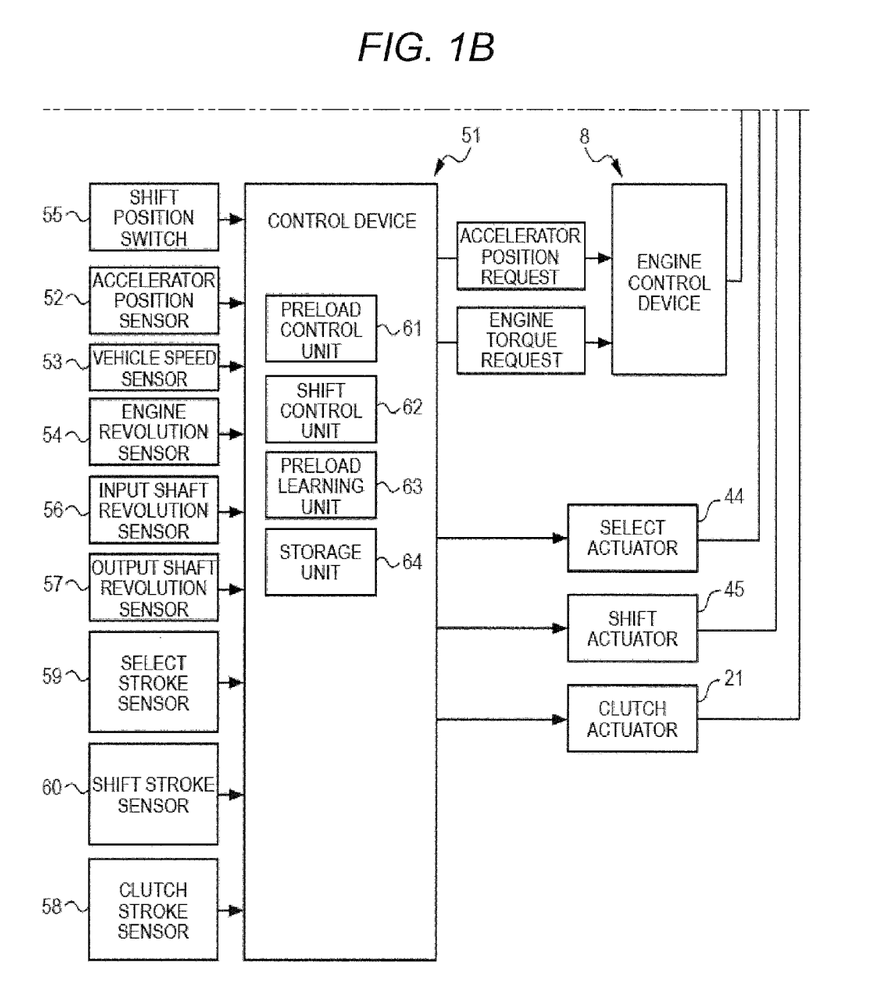

FIGS. 1 to 13 show an embodiment of the invention. In FIGS. 1A and 1B, a reference numeral '1' indicates a vehicle, a reference numeral '2' indicates an engine that is a motor, a reference numeral '3' indicates an automatic clutch that transmits and interrupts a driving force and a reference numeral '4' indicates an automatic transmission that converts the driving force. The driving force that is generated by the engine 2 is input to the automatic transmission 4 through the automatic clutch 3 and is converted by the automatic transmission 4, which is then transmitted to driving axles 6 by a differential member 5 and drives driving wheels 7 to thus run the vehicle 1.

The engine 2 generates the driving force while an air intake quantity and a fuel quantity thereof are controlled by an engine control device 8. The driving force of the engine 2 is output to the automatic clutch 3 through a crankshaft 9.

Figure 2:
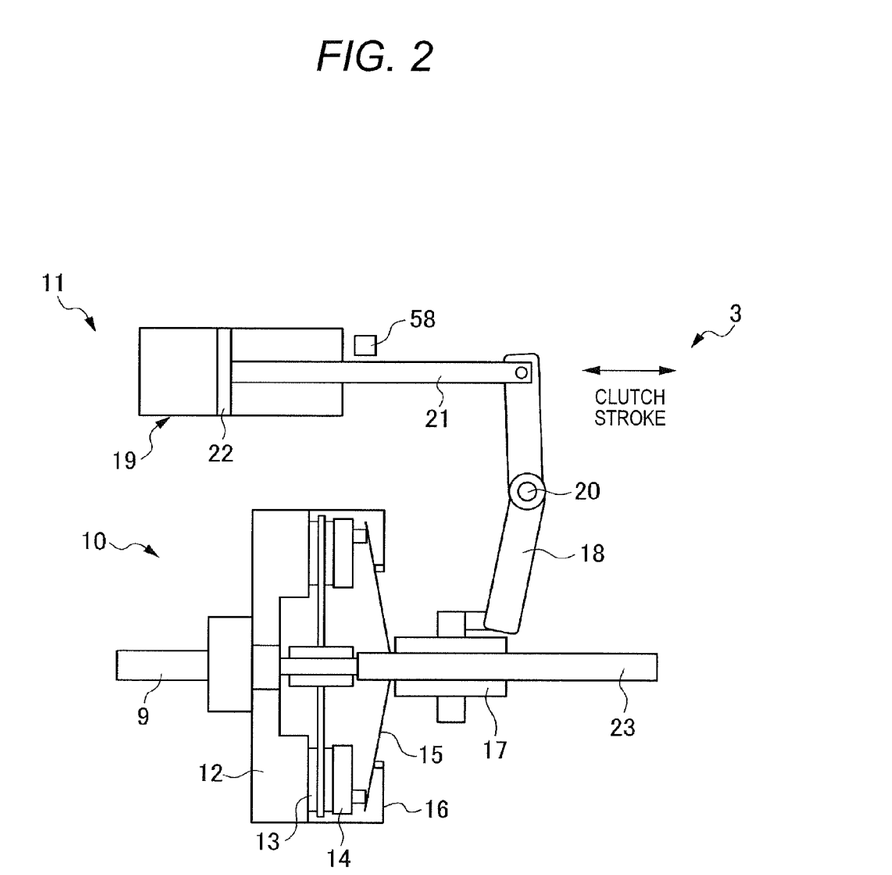
FIG. 2 is a sectional view of an automatic clutch.

The automatic clutch 3 is provided between the engine 2 and the automatic transmission 4 and has a friction clutch 10 and a clutch operating apparatus 11, as shown in FIG. 2.

The friction clutch 10 has a flywheel 15, a clutch disc 13, a pressure plate 14, a diaphragm spring 15 and a clutch cover 16. The flywheel 12 is connected with the crankshaft 9. The clutch disc 13 is supported to an input-side rotary shaft 23 (which will be described later) of the automatic transmission 4 so that it can be axially moved and cannot be circumferentially rotated. The pressure plate 14 presses the clutch disc 13 to the flywheel 12. The diaphragm spring 15 has a central part into which the input-side rotary shaft 23 of the automatic transmission 4 is inserted, a circumferentially central portion that is supported to the clutch cover 16 attached to the flywheel 12 and a peripheral part that is brought into contact with the pressure plate 14, thereby pressing the pressure plate towards the flywheel 12 with an elastic force.

The friction clutch 10 applies the elastic force of the diaphragm spring 15 to the pressure plate 14 to thus press the clutch disc 13 to the flywheel 12, so that a connection state is made. As a result, the driving force is transmitted to the automatic transmission 4. Also, the friction clutch 10 removes the elastic force being applied from the diaphragm spring 15 to the pressure plate 14 to thus disable the clutch disc 13 from being pressed to the flywheel 12, so that a release state is made. Thereby, the transmission of the driving force to the automatic transmission 4 is interrupted.

The clutch operating apparatus 11 is operated between the connection state of the friction clutch 10 and the release state thereof, thereby transmitting and interrupting the driving force and adjusting the driving force to be transmitted.

The clutch operating apparatus 11 has a release bearing 17, a release fork 18 and a clutch actuator 19. The release bearing 17 is fitted to the input-side rotary shaft 23 of the automatic transmission 4 so that it can be axially moved and is brought into contact with the central part of the diaphragm spring 15. The release fork 18 is swingably supported to a support shaft 20 and has one end that is connected to the release bearing 17 and the other end that is connected to a release rod 21 of the clutch actuator 19. The clutch actuator 19 advances and retreats the release rod 21 by a piston 22 to which a hydraulic pressure supplied from a driving source (not shown) is applied and thus swings the release port 18 about the support shaft 20, thereby pushing and retreating the release bearing 17 towards and from the diaphragm spring 15.

The clutch operating apparatus 11 retreats the release rod 21 of the clutch actuator 19 to thus retreat the release bearing 17 through the release fork 18 in a direction getting away from the diaphragm spring 15, thereby putting the friction clutch 10 at the connection state. Also, the clutch operating apparatus 11 advances the release rod 21 of the clutch actuator 19 to thus push the release bearing 17 towards the diaphragm spring 15 through the release fork 18, thereby putting the automatic clutch 3 at the release state.

As shown in FIGS. 1A and 1B, the automatic transmission 4 is a stepped transmission of a constant mesh type, has the input-side rotary shaft 23 and an output-side rotary shaft 24 and also has a plurality of gear pairs 25 having different gear ratios at the input-side rotary shaft 23 and the output-side rotary shaft 24. In FIG. 1, the gear pairs 25-1, 25-2, . . . , 25-$n$ are provided. The input-side rotary shaft 23 is connected to the clutch disc 13 of the automatic clutch 3. The output-side rotary shaft 24 is connected to the differential member 5.

The gear pairs 25-1, 25-2, . . . , 25-$n$ are arranged so that one gears 25-1$a$, 25-2$a$, . . . , 25-$na$ and the other gears 25-1$b$, 25-2$b$, . . . , 25-$nb$ are always meshed with forming the pairs. The one (input-side) gears 25-1$a$, 25-2$a$, . . . , 25-$na$ are supported to the input-side rotary shaft 23 so that they integrally rotate or run idle. The other (output-side) gears 25-1$b$, 25-2$b$, . . . , 25-$nb$ are supported to the output-side rotary shaft 24 so that they integrally rotate or run idle. In this embodiment, the input-side gears 25-1$a$, 25-2$a$, . . . , 25-$na$ are supported to the input-side rotary shaft 23 so that they integrally rotate or run idle and the output-side gears 25-1$b$, 25-2$b$, . . . , 25-$nb$ are supported to the output-side rotary shaft 24 so that they run idle.

The automatic transmission 4 couples one of the gear pairs 25-1, 25-2, . . . , 25-$n$, which are arranged to always mesh, for example the output-side gear 25-1$b$ of the gear pair 25-1 to the output-side rotary shaft 24 by a synchromesh mechanism 26 (which will be described later) to thus put the gear pair 25-1 into a state where the gear pair 25-1 transmits the power of the engine 2, so that it is possible to obtain a gear stage (for example, first gear) corresponding to the gear pair 25-1. At this, the other gear pairs 25-2, . . . , 25-$n$ except for the gear pair 25-1 are at a power non-transmission state. The automatic transmission 4 can also couple the other gear pairs 25-2, ..., 25-n to the output-side rotary shaft 24 by the synchromesh mechanism 26 to thus put the gear pairs 25-2, ..., 25-n into the state where the gear pairs transmit the power of the engine, so that it is possible to obtain gear stages (for example, second gear, ..., highest speed) corresponding to the gear pairs 25-2, ..., 25-n.

In the meantime, the automatic transmission 4 has reverse gear pairs at the input-side rotary shaft 23 and the output-side rotary shaft 24 and can obtain reverse speed by putting the reverse gear pairs into a state at which the reverse gear pairs transmit the power of the engine 2.

The automatic transmission 4 has the synchromesh mechanism 26 that couples the gears 25-1b, 25-2b, ..., 25-nb of the gear pairs 25-1, 25-2, ..., 25-n and the output-side rotary shaft 24 and transmits the driving force of the engine 2 to the gear pairs 25-1, 25-2, ..., 25-n. In FIGS. 1A and 1B, the synchromesh mechanisms 26-1, 26-2, ..., 26-n are provided in correspondence to the respective gear pairs 25-1, 25-2, ..., 25-n. Meanwhile, since the respective synchromesh mechanisms 26-1, 26-2, ..., 26-n basically have the same configuration, the synchromesh mechanism 26-1 of the gear pair 25-1 shown in FIGS. 3 and 4 will be specifically described and the specific descriptions of the other synchromesh mechanisms 26-2, ..., 26-n will be omitted.

Figure 3:
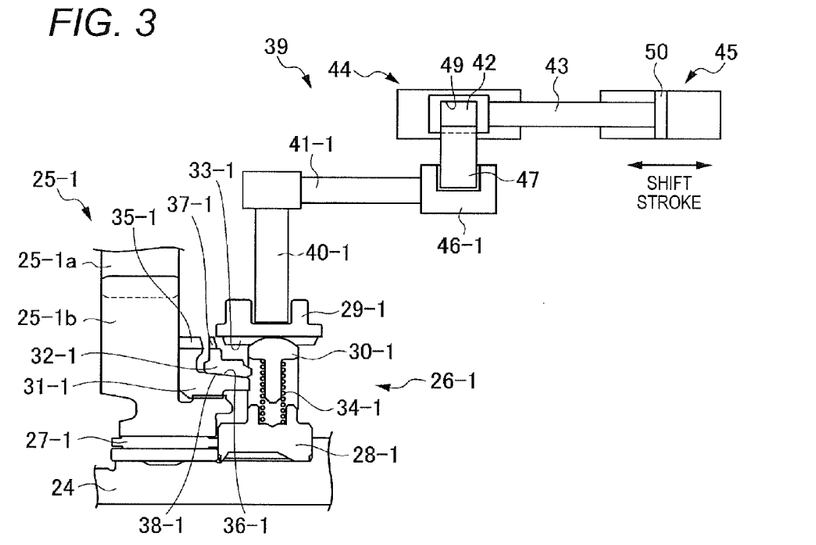
FIG. 3 shows a configuration of a synchromesh mechanism upon neutral.
Figure 4:
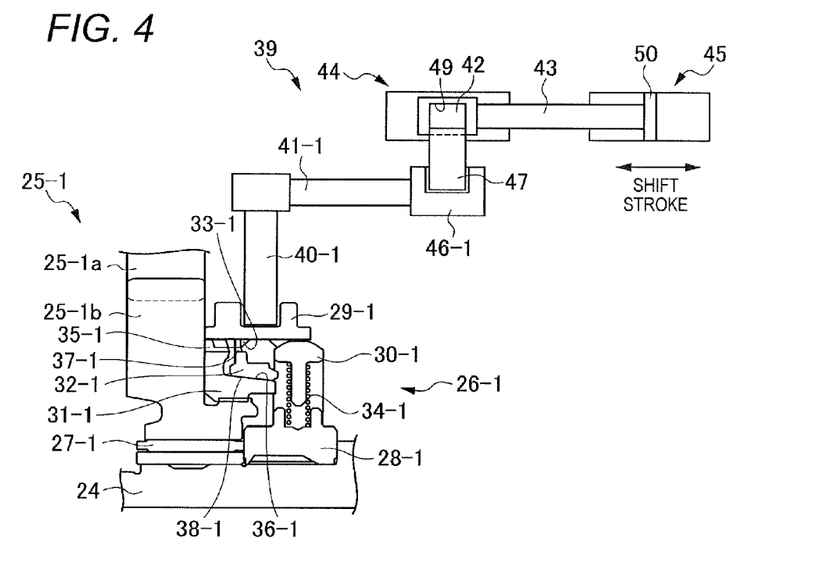
FIG. 4 shows a configuration of the synchromesh mechanism upon shift completion.

In FIGS. 3 and 4, the output-side gear 25-1b of the gear pair 25-1, which is switched between the power transmission state and the power non-transmission state by the synchromesh mechanism 26-1, is supported to the output-side rotary shaft 24 through a bearing 27-1 so that it runs idle. In the meantime, like the gear 25-1b, the gears 25-2b, ..., 26-nb of the other gear pairs 26-2, ..., 26-n are also supported to the output-side rotary shaft 24 through bearings (not shown) so that they run idle.

The synchromesh mechanism 26-1 that switches the gear pair 25-1 between the power transmission state and the power non-transmission state has a clutch hub 28-1, a sleeve 29-1 that is operated by a switching apparatus 39 (which will be described later), a shifting key 301, a clutch gear 31-1 and a synchronizer ring 32-1.

The clutch hub 28-1 is fixed to the output-side rotary shaft 24 in the vicinity of the gear 25-1 b of the gear pair 25-1 and integrally rotates together with the output-side rotary shaft 24. The sleeve 29-1 is formed with an inner periphery spline 33-1 that is slidably engaged with an outer periphery spline (not shown) formed on an outer periphery of the clutch hub 28-1. The sleeve 29-1 is moved relative to the clutch hub 28-1 in a shift direction (axial direction of the output-side rotary shaft 24) by the switching apparatus 39. The shifting key 30-1 is pushed to the inner periphery spline 33-1 of the sleeve 29-1 by a spring 34-1 and is moved in the shift direction (axial direction of the output-side rotary shaft 24) together with the sleeve 29-1.

The clutch gear 31-1 is fixed to the output-side gear 25-1b that is supported to the output-side rotary shaft 24 so that it runs idle, and integrally rotates together with the gear 25-1b. The clutch gear 31-1 has an outer periphery spline 35-1 that is engaged with the inner periphery spline 33-1 of the sleeve 29-1 and an outer periphery cone surface 36-1 that the synchronizer ring 32-1 slidingly contacts. The synchronizer ring 32-1 has an outer periphery spline 37-1 that is engaged with the inner periphery spline 33-1 of the sleeve 29-1 and an inner periphery cone surface 38-1 that slidingly contacts the outer periphery cone surface 36-1 of the clutch gear 31-1.

When the synchronizer ring 32-1 is pressed in the gear 25-1b direction by the sleeve 29-1, the synchronizer ring 32-1 presses the inner periphery cone surface 38-1 to the outer periphery cone surface 36-1 of the clutch gear 31-1 fixed to the gear 25-1b that runs idle on the output-side rotary shaft 24 with the number of revolutions synchronous with the input-side rotary shaft 23. Also, the shifting key 30-1 contacts the synchronizer ring 32-1 at an early stage of the movement of the sleeve 29-1 in the direction of the gear 25-1b, thereby pressing the synchronizer ring 32-1 in the direction of the gear 25-1b.

The automatic transmission 4 has the switching apparatus 39 that applies load to the synchromesh mechanisms 26-1, 26-2, ..., 26-n to thereby switch the coupling state of the gear pairs 25-1, 25-2, ..., 26-n and the output-side rotary shaft 24.

Figure 5:
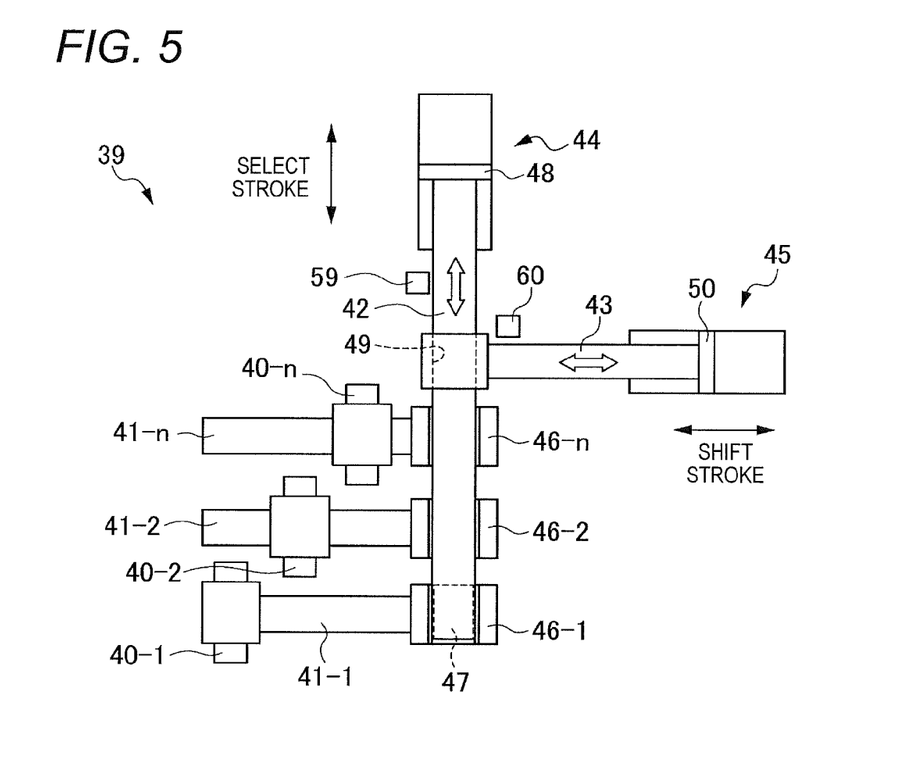
FIG. 5 shows a configuration of a switching apparatus.

As shown in FIG. 5, the switching apparatus 39 has shift forks 40-1, 40-2, ..., 40-n, shift fork shafts 41-1, 41-2, ..., 41-n, a select rod 42, a shift rod 43, a select actuator 44 and a shift actuator 45.

The shift fork 40-1 is engaged with the sleeve 29-1 of the synchromesh mechanism 26-1. Also, the other shift forks 40-2, ..., 40-n are engaged with respective sleeves (not shown) of the other synchromesh mechanisms 26-2, ..., 26-n. The shift fork shafts 41-1, 41-2, ..., 41-n are members extending in a shift direction, and are provided at one sides thereof with the shift forks 40-1, 40-2, ..., 40-n and at the other sides thereof with recess-shaped heads 46-1, 46-2, ..., 46-n extending in a select direction.

The select rod 42 is a member that extends in the select direction perpendicular to the shift fork shafts 41-1, 41-2, ..., 41-n. The select rod 42 has one side to which a select lever 47 to be engaged with the heads 46-1, 46-2, ..., 46-n is provided and the other side that is connected to a piston 48 of the select actuator 44. The select actuator 44 operates the select rod 42 in the select direction by the piston 48 to which the hydraulic pressure supplied from a driving source (not shown) is applied, thereby enabling the select lever 47 to be selectively engaged with any one of the heads 46-1, 46-2, ..., 46-n. In FIG. 5, the select lever 47 is engaged with the head 46-1.

Thereby, since the shift fork shaft 41-1 to which the head 46-1 having the select lever 47 engaged thereto is provided enables the shift fork 40-1 to be engaged with the sleeve 29-1 of the synchromesh mechanism 26-1, the sleeve 29-1 of the synchromesh mechanism 26-1 is selected.

Also, the shift rod 43 is a member extending in the shift direction and has one side at which an insertion hole 49, which extends in the select direction and enables the select rod 42 to be inserted therein, is formed and the other side that is connected to a piston 50 of the shift actuator 45. The shift actuator 45 operates the shift rod 43 in the shift direction by the piston 50 to which the hydraulic pressure supplied from the driving source (not shown) is applied, thereby moving the select rod 42 of the select actuator 44 in the shift direction. The select rod 42 moving in the shift direction operates, in the shift direction, any one head 46-1, 46-2, ..., 46-n to which the select lever 47 is engaged, for example, in FIG. 5, the head 46-1 to which the select lever 47 is engaged, thereby moving the shift fork 40-1 in the shift direction.

Thereby, the sleeve 29-1 of the synchromesh mechanism 26-1 is moved in the shift direction.

That is, the switching apparatus 39 selects any one of the sleeves 29-1, 29-2, ..., 29-n of the synchromesh mechanisms 26-1, 26-2, ..., 26-n, in FIG. 5, the sleeve 29-1 of the synchromesh mechanism 26-1 by the operation of the select actuator 44. Then, the switching apparatus 39 moves the sleeve 29-1 of the selected synchromesh mechanism 26-1 to a neutral position (shift disengagement position) shown in FIG. 3 or a shift position (shift engagement position) shown in FIG. 4 by the operation of the shift actuator 45.

The switching apparatus 39 moves the sleeve 29-1 of the synchromesh mechanism 26-1 to the neutral position (shift disengagement position) to thereby loosen the coupling of the gear 25-1b of the gear pair 25-1 and the output-side rotary shaft 24 and thus puts the gear 25-1b into a state (power non-transmission state) where the gear 25-1b runs idle relative to the output-side rotary shaft 24, thereby removing the driving force transmission of the engine 2 by the gear pair 25-1. In the meantime, the switching apparatus 39 moves the sleeve 29-1 of the synchromesh mechanism 26-1 to the shift position (shift engagement position) to thereby couple the gear 25-1b of the gear pair 25-1 and the output-side rotary shaft 24 and thus puts the gear 25-1b into a state (power transmission state) where the gear 25-1b is fixed to the output-side rotary shaft 24, thereby transmitting the driving force of the engine 2 by the gear pair 25-1.

As shown in FIGS. 1A and 1B, the clutch actuator 19, the select actuator 44 and the shift actuator 45 are controlled by the control device 51 of the automatic transmission 4.

The control device 51 has an accelerator position sensor 52 that detects a pedaling state of an accelerator pedal of the vehicle 1, a vehicle speed sensor 53 that detects a speed of the vehicle 1, an engine revolution sensor 54 that detects the number of revolutions of the engine 2, a shift position switch 55 that detects a shift position operated by a driver, an input shaft revolution sensor 56 that detects the number of revolutions of the input-side rotary shaft 23 of the automatic transmission 4, an output shaft revolution sensor 57 that detects the number of revolutions of the output-side rotary shaft 24 of the automatic transmission 4, a clutch stroke sensor 58 that detects a stroke amount of the release rod 21 of the clutch actuator 19, a select stroke sensor 59 that detects a stroke amount of the select rod 42 of the select actuator 44 and a shift stroke sensor 60 that detects a stroke amount of the shift rod 43 of the shift actuator 45.

When the shift position is changed by an operation of a driver, which is detected by the shift position switch 55, or a driving state of the vehicle 1 is changed, which is detected by the accelerator position sensor 52, the vehicle speed sensor 53 and the like, and a shift transmission request is thus detected, the control device 51 applies the load to the synchromesh mechanisms 26-1, 26-2, ..., 26-n by the select actuator 44 and shift actuator 45 of the switching apparatus 39, thereby switching the coupling state of the gear pairs 25-1, 25-2, ..., 25-n and the input-side rotary shaft 23 and output-side rotary shaft 24. Also, the control device 51 outputs an accelerator position request and an engine torque request to the engine control device 8 and controls the driving force to be generated by controlling the air intake quantity and fuel quantity of the engine 2. The engine torque request is calculated based on the engine revolutions and the like.

The control device 51 of the automatic transmission 4 has a preload control unit 61 and a shift control unit 62. When the shift transmission request is detected, the preload control unit 61 operates the shift actuator 45 of the switching apparatus 39 to thereby apply preload Ps to the synchromesh mechanisms 26-1, 26-2, ..., 26-n. After the preload Ps is applied, the shift control unit 62 operates the shift actuator 45 of the switching apparatus 39 to thus apply shift load Pt greater than the preload Ps to the synchromesh mechanisms 26-1, 26-2, ..., 26-n.

The predetermined time period for which the preload Ps is applied is a time period from a time point at which the shift transmission request is detected to a time point at which a shift stroke amount Xs of the shift actuator 45 exceeds a predetermined value Xs1. Also, the predetermined time period is a time period from a time point at which the shift transmission request is detected to a time point at which the automatic clutch 3 is released.

Also, the control device 51 of the automatic transmission 4 has a preload learning unit 63 and a storage unit 64. When a clutch stroke amount Xc1, which is measured by the clutch stroke sensor 58, exceeds a predetermined range (XcA<Xc1<XcB) upon completion of the control of operating the shift actuator 45 to thus apply the preload Ps, the preload learning unit 63 learns the preload Ps so that the clutch stroke amount Xc1 gets within the predetermined range (XcA<Xc1<XcB).

In the learning of the preload Ps, a learning value □ is calculated based on a deviation of a clutch stroke amount Xcn of this time and a clutch stroke amount Xc1 of previous time and a load correction value An1 of this time is corrected by the learning value □, so that a load correction value An after correction is obtained. The obtained load correction value An after correction is stored in the storage unit 64. Upon the preload control of next time, the stored load correction value An is called and is used for the calculation of the preload Ps, so that the preload Ps is learned.

In the below, the operations are described.

The control device 51 of the automatic transmission 4 operates the shift actuator 45 of the switching apparatus 39 and thus applies the load to the synchromesh mechanism of the gear pair under power transmission state of the synchromesh mechanisms 26-1, 26-2, ..., 26-n corresponding to the gear pairs 25-1, 25-2, ..., 25-n, thereby performing the shift disengagement to thus switch the coupling state. The sleeves 33-1, 33-2, ..., 33-n of the synchromesh mechanisms 26-1, 26-2, ..., 26-n, the shift forks 40-1, 40-2, ..., 40-n of the switching apparatus 39 and the like perform the basically same operation. Therefore, in the below, the operations are described while they are simply indicated by the gear pair 25, the synchromesh mechanism 26, the shift fork 40 and the like.

Figure 6:
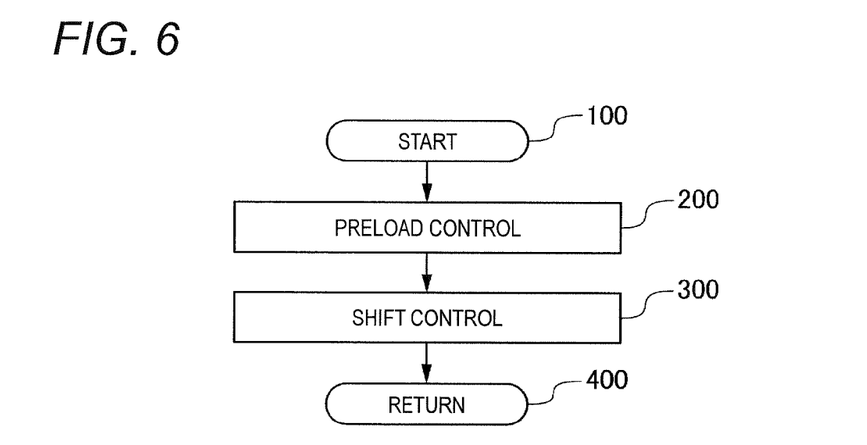
FIG. 6 is a flowchart of shift transmission control.

As shown in FIG. 6, when a program of the shift transmission control starts (100), the control device 51 of the automatic transmission 4 executes the preload control (Phase1 of FIG. 8) (200), executes the shift control (Phase2 of FIG. 8) (300) and then returns (400).

Figure 7:
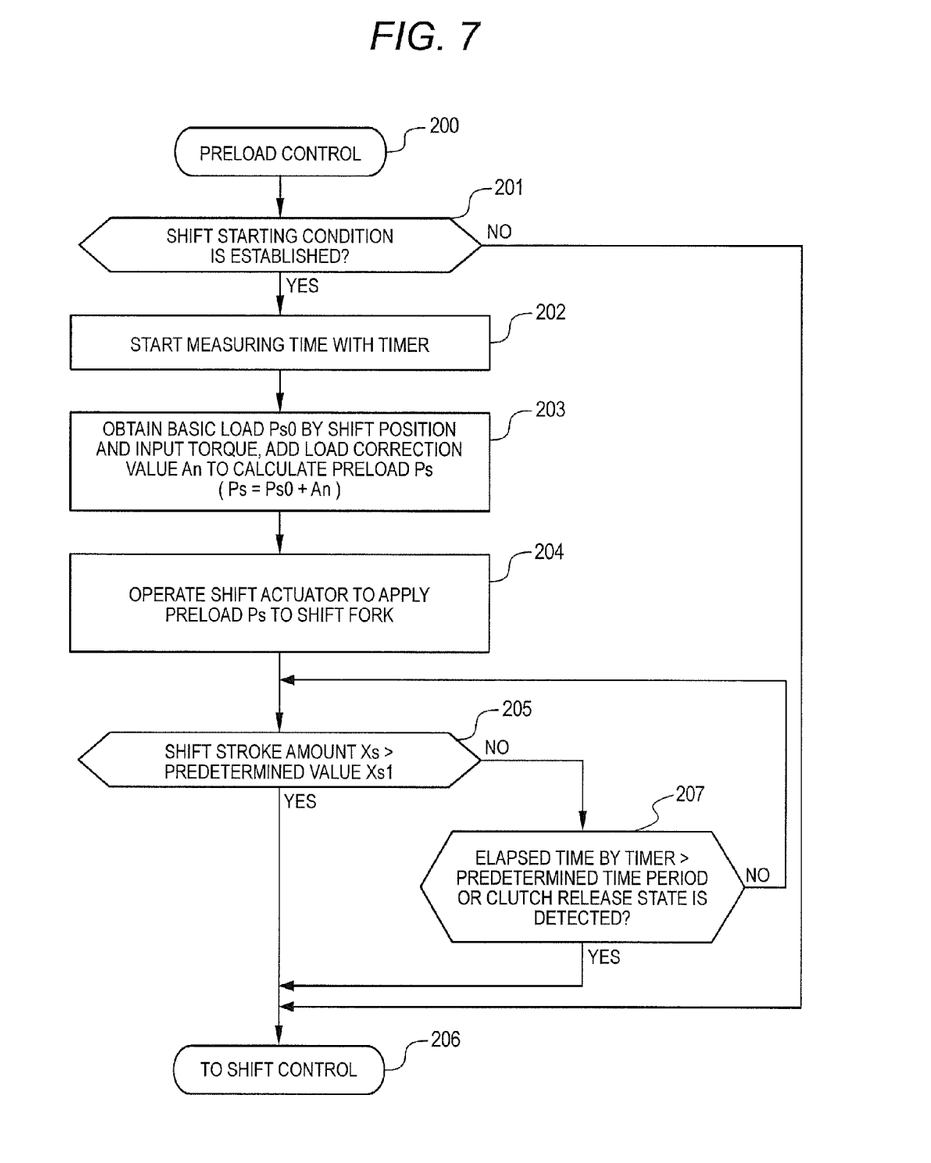
FIG. 7 is a flowchart of preload control.

In the preload control (200), the control device 51 determines whether a shift starting condition is established by detecting the shift transmission request (201), as shown in FIG. 7. The shift transmission request is detected by the change in the shift position by the operation of the driver and the change in the driving state such as accelerator opening degree, vehicle speed and the like. The shift starting condition is determined by the accelerator opening degree and the vehicle speed. Specifically, when the accelerator opening degree and the vehicle speed exceed predetermined threshold values, it is determined that the shift starting condition is established.

When a result of the determination (201) is NO, the control device 51 proceeds to the shift control (300) (206). When a result of the determination (201) is YES, the control device 51 starts the shift transmission control (t1 in FIG. 8), starts measuring time from the time point at which the shift starting condition is established by a timer (202), obtains a basic load Ps0 by the shift position and input torque, adds the load correction value An and thus calculates the preload Ps (Ps=Ps0+An) (203).

Figure 10:
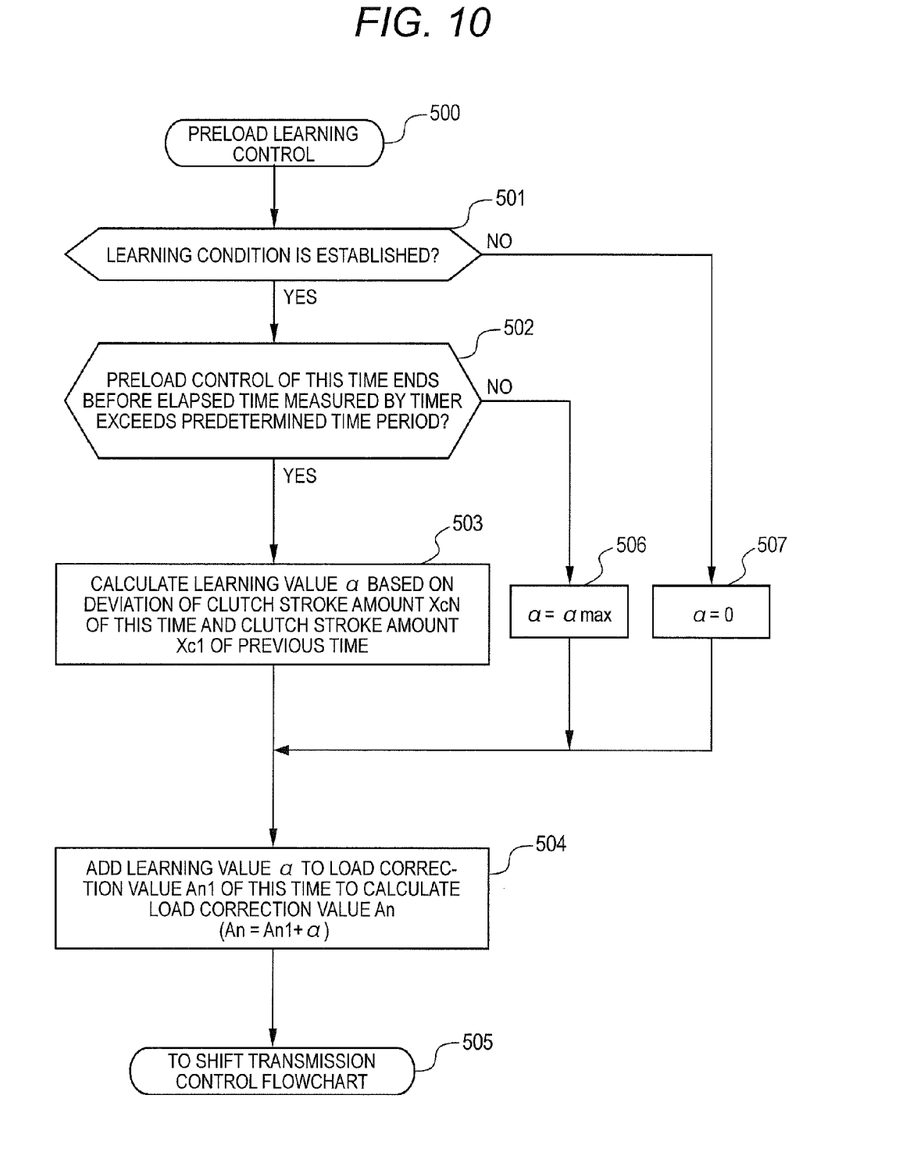
FIG. 10 is a flowchart of preload learning control.
Figure 11:
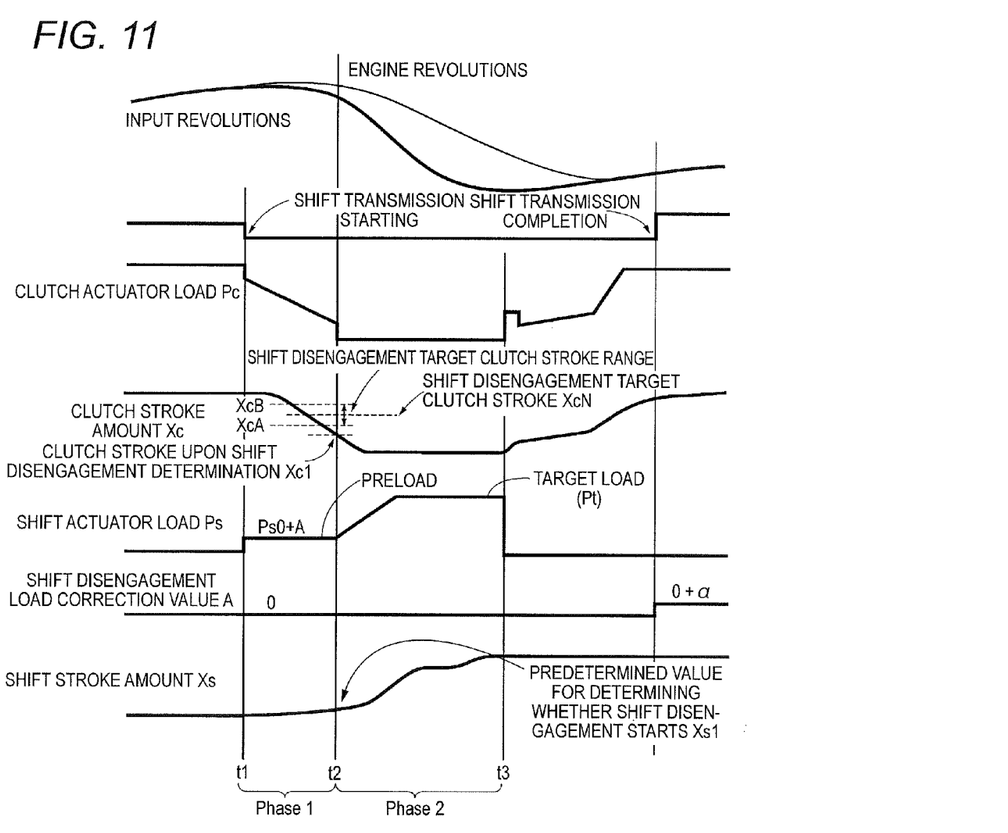
FIG. 11 is a timing chart of the preload learning control.
Figure 12:
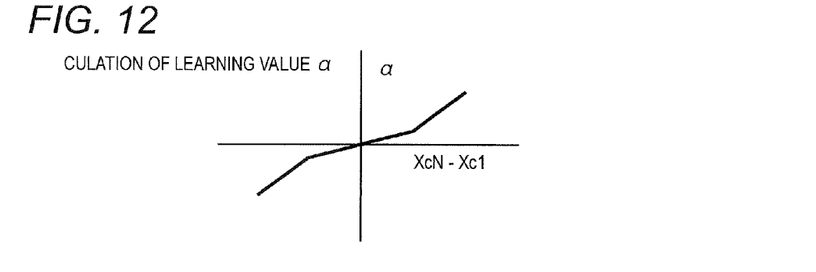
FIG. 12 illustrates a calculation of a learning value.

As the shift position, the value stored in the storage unit 64 of the control device 51 is used. The shift position is updated at any time whenever the control device 51 performs the shift change (the change of the gear pair becoming the power transmission state). In the meantime, the shift position may be calculated and estimated from output values of the select stroke sensor 59 and shift stroke sensor 60. The input torque of the automatic transmission 4 is estimated from the engine revolutions, the accelerator opening degree, the shift position and the like. Based on the shift position and the input torque, the control device 51 calculates the basic load Ps0 (refer to FIG. 9) and adds the load correction value An to the basic load Ps0, thereby calculating the preload Ps. Also, the control device 51 learns the load correction value An, as shown in FIG. 10.

After calculating the preload Ps (203), the control device 51 operates the shift actuator 45 to thus apply the calculated preload Ps to the shift fork 40 (204), gradually releases the coupling of the gear pair 25 and the output-side rotary shaft 24 through the shift fork 40 by the synchromesh mechanism 26 and determines whether the shift stroke amount Xs of the shift actuator 45 exceeds a predetermined value Xs1 (205).

When the shift stroke amount Xs, which is detected by the shift stroke sensor 60, exceeds the predetermined value Xs1 and a result of the determination (205) is thus YES, the control device 51 considers that a shift disengagement time has come, i.e., that the automatic clutch 3 has been sufficiently released, ends the preload control (Phase1) (t2 in FIG. 8) and proceeds to the shift control (300) of FIG. 6 (206).

On the other hand, when the shift stroke amount Xs, which is detected by the shift stroke sensor 60, is the predetermined value Xs1 or smaller and a result of the determination (205) is thus NO, the control device 51 determines whether the elapsed time checked by the timer runs beyond the predetermined time (elapsed time>predetermined time) or whether the release state of the automatic clutch 3 is detected (207).

When a result of the determination (207) is NO, the control device 51 returns to the determination (205). When a result of the determination (207) is YES, the control device 51 proceeds to the shift control (300) of FIG. 6 (206). Like this, even when the shift stroke amount Xs is the predetermined value Xs1 or smaller (205: NO), if the predetermined time has elapsed (207: YES), the control device 51 forcibly ends the preload control and proceeds to the shift control (300).

Figure 8:
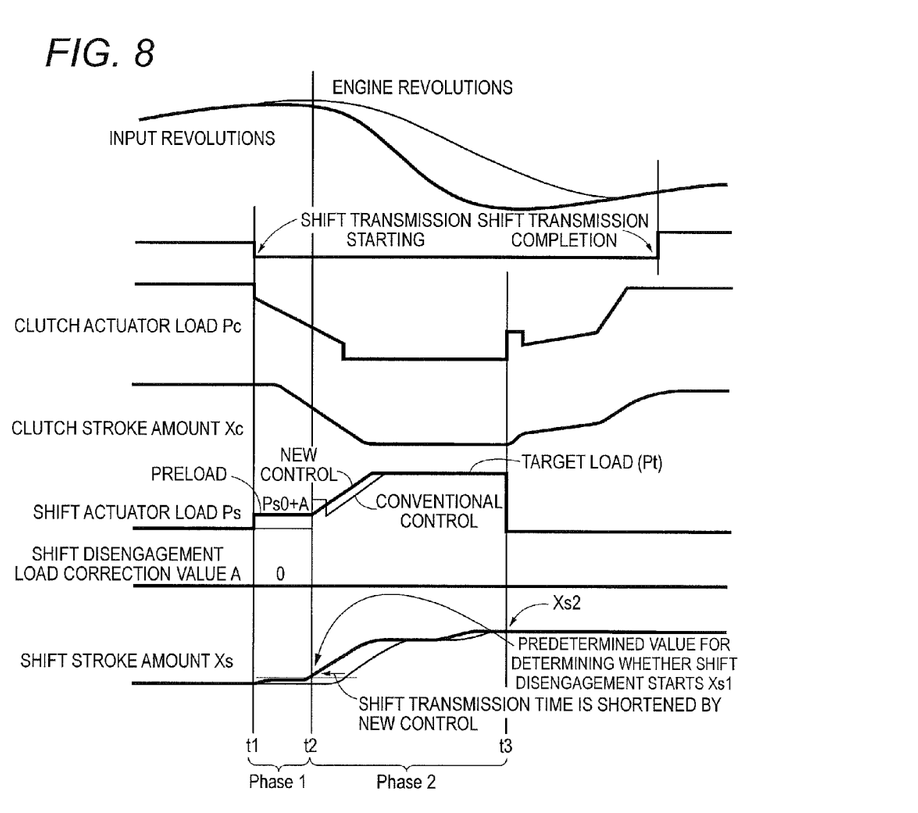
FIG. 8 is a timing chart of the preload control.
Figure 9:
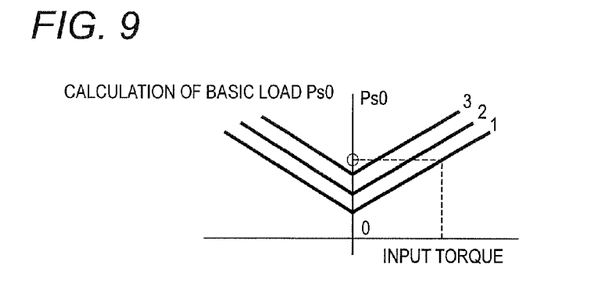
FIG. 9 illustrates a calculation of basic load based on input torque.

In the shift control (300), the control device 51 operates the shift actuator 45 of the switching apparatus 39 from time t2 of FIG. 8 and thus applies the shift load Pt greater than the preload Ps to the synchromesh mechanism 26 through the shift fork 40. The shift load Pt is removed when the shift stroke amount Xs of the shift rod 43 of the shift actuator 45 reaches a predetermined value Xs2 of the shift disengagement (t3 in FIG. 8).

The control device 51 of the automatic transmission 4 performs the clutch release of the automatic clutch 3 and the shift disengagement operation of the automatic transmission 4 at the same time and securely determines the shift disengagement by using the shift stroke amount.

When the shift transmission starts (t1 in FIG. 8), the control device 51 of the automatic transmission 4 starts to remove the load of the automatic clutch 3 and starts Phase1 in which the control device applies the preload Ps (basic load Ps0+load correction value An) of the shift disengagement based on the shift position and input torque. During the coupling of the automatic clutch 3, the clutch gear 31 of the gear pair 25 and the sleeve 29 of the synchromesh mechanism 26 are spline-fitted, so that the sleeve 29 is not disengaged at low load and the sleeve 29 hardly strokes in the shift direction.

When the control device 51 of the automatic transmission 4 gradually releases the automatic clutch 3, the spline fitting force of the clutch gear 31 and the sleeve 29 of the synchromesh mechanism 26 in the rotational direction is weakened and the fitting is thus released, so that the sleeve 29 starts the stroke. In order to securely determine whether the shift disengagement starts, the predetermined value Xs1 of the shift stroke amount Xs is provided. When the actual shift stroke amount Xs exceeds the predetermined value Xs1, the control device 51 proceeds to Phase2 in which the control device applies the shift load Pt greater than the preload Ps to thus perform the shift disengagement (t2 in FIG. 8).

Like this, when the shift transmission request is detected, since the control device 51 of the automatic transmission 4 applies the preload Ps to the synchromesh mechanism 26 by the preload control, the control device 51 gradually releases the coupling of the gear pair 25 and the output-side rotary shaft 24 by the synchromesh mechanism 26 during the preload control. When the coupling of the gear pair 25 and the output-side rotary shaft 24 is loosened, the shift load Pt greater than the preload Ps is applied to the synchromesh mechanism 26 by the shift control.

That is, when the shift transmission request is detected, the control device 51 of the automatic transmission 4 applies the low load in the preload control to thus release a little the coupling state of the gear pair 25 and the output-side rotary shaft 24 by the synchromesh mechanism 26, thereby reducing the torsional load that is applied to the output-side rotary shaft 24 of the automatic transmission 4. After that, the predetermined time has elapsed and the torsional load has been reduced upon the execution of the shift control. Therefore, it is possible to reduce the vibrations occurring when the coupling of the gear pair 25 and the output-side rotary shaft 24 is released by the synchromesh mechanism 26. Also, the preload Ps is applied, so that the time necessary to reach the shift load Pt, which is a target load for performing the shift control, is shortened. Thereby, it is possible to shorten the time necessary for the shift change.

Also, the control device 51 of the automatic transmission 4 applies the preload Ps for the predetermined time period from the time point at which the shift transmission request is detected to the time point at which the shift stroke amount Xs of the shift actuator 45 becomes the predetermined value Xs1 or larger. Thereby, since the control device 51 does not execute the shift control until the synchromesh mechanism 26 becomes sufficiently distant from the gear pair 25 and it is thus detected that the coupling state is loosened, it is possible to securely suppress the vibrations.

At the engaged state of the automatic clutch 3 that is provided between the engine 2 and the automatic transmission 4, the torsional load that is applied to the input-side rotary shaft 23 and output-side rotary shaft 24 of the automatic transmission 4 is strong, so that it may be difficult to release the synchromesh mechanism 26 even though the preload control is executed. On the other hand, at the release state of the automatic clutch 3, since the torsional load that is applied to the input-side rotary shaft 23 and output-side rotary shaft 24 of the automatic transmission 4 is removed, the synchromesh mechanism 26 starts the release after the automatic clutch 3 is released. However, for a case where even after the automatic clutch 3 is released, the control device executes the preload control and then proceeds to the shift control, the time necessary to complete the shift change is uselessly prolonged.

Therefore, the control device 51 of the automatic transmission 4 applies the preload Ps for the predetermined time period from the time point at which the shift transmission request is detected to the time point at which the automatic clutch 3 is released, thereby detecting the release state of the automatic clutch 3. At this time, when the preload control is being executed, the control device 51 immediately switches the preload control to the shift control. As a result, it is possible to prevent the time necessary to complete the shift change from being prolonged.

The control device 51 of the automatic transmission 4 learns the preload Ps that is the shift disengagement load. In the learning of the preload Ps, the control device 51 performs preload learning control in which the load correction value An is corrected with the learning value □.

As shown in FIG. 10, in load correction value learning control (500), the control device 51 determines whether a learning condition is established, during the flowchart of the shift transmission control shown in FIG. 6 (501). Whether the learning condition is established is determined whether the clutch stroke amount Xc1, which is used upon the shift disengagement determination of the automatic clutch 3, is within a range of predetermined errors XcA and XcB (XcA<Xc1<XcB) in Phase1 from time t1 to time t2 of the shift transmission control shown in FIG. 11.

When the learning condition is established with the clutch stroke amount Xc1 being beyond the range of the errors (Xc1>XcA, XcB<Xc1) and a result of the determination (501) is YES, the control device 51 executes steps (502 to 506) because the normal shift change may not be performed due to the aging degradation and the like.

First, the control device 51 determines whether the preload control of this time ends before the elapsed time checked by the timer runs beyond the predetermined time (502).

When the preload control of this time ends before the elapsed time runs beyond the predetermined time and a result of the determination (502) is thus YES, the control device 51 calculates the learning value □ (refer to FIG. 12) (503), based on the deviation of the clutch stroke amount Xcn of this time and the clutch stroke amount Xc1 of previous time, adds the calculated learning value □ to the load correction value An1 of this time to thus calculate the load correction value An (504) and returns to the flowchart of the shift transmission control shown in FIG. 6 (505).

On the other hand, when the preload control of this time does not end before the elapsed time runs beyond the predetermined time and a result of the determination (502) is thus NO, the control device 51 calculates the learning value □ as a maximum value □max (□=□max) (506), adds the calculated learning value □ to the load correction value An1 of this time to thus calculate the load correction value An (504) and returns to the flowchart of the shift transmission control shown in FIG. 6 (505).

Also, when the learning condition is established with the clutch stroke amount Xc1 being within the range of the errors (XcA<Xc1<XcB) and a result of the determination (501) is NO, since the shift change is normally performed, the control device 51 calculates the learning value □ as 0 (□=0) (507), adds the calculated learning value □ to the load correction value An1 of this time to thus calculate the load correction value An (504) and returns to the flowchart of the shift transmission control shown in FIG. 6 (505).

Figure 13:
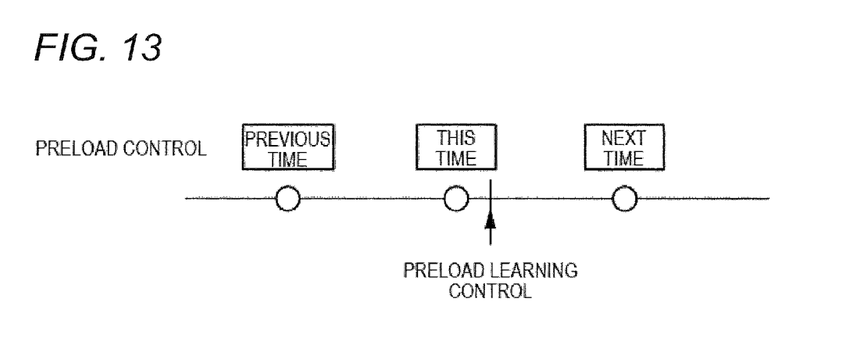
FIG. 13 shows a relation between the preload control and the preload learning control.

As shown in FIG. 13, the control device 51 starts the preload learning control (500) after the preload control (200) of this time ends. The load correction value An corrected by the preload learning control is stored in the storage unit 64, is called upon the preload control of next time and is used for the calculation (Ps=Ps0+A) of the preload Ps.

Like this, since the vibrations of the individual members or the temporal changes are absorbed, the control device 51 of the automatic transmission 4 learns the preload Ps that is the shift disengagement load every the input torque zone. When the clutch stroke amount Xc1, which is measured upon the completion of the control of applying the preload Ps, is beyond the predetermined range (Xc1>XcA, XcB<Xc1), the control device Si learns the preload Ps so that the clutch stroke amount Xc1 gets within the predetermined range (XcA<Xc1<XcB). Thereby, even when the automatic clutch 3 is worn due to the aging degradation and the power transmission state is thus changed (in case of the wearing, the transmission force is reduced at the early stage), the control device 51 can constantly keep the starting time of the shift control.

Meanwhile, in the above embodiment, the shift stroke amount is used to determine whether the shift disengagement starts. However, the shift stroke speed may be also used. Also, in the learning of the preload Ps, a difference between the number of output revolutions of the engine and the number of input revolutions of the automatic transmission may be also used as the basis of the learning.

The invention can suppress the vibrations occurring upon the shift transmission of the automatic transmission and perform the rapid shift transmission. The invention can be also applied to an automatic transmission other than the automatic transmission that is a stepped transmission of a constant mesh type.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A control device for an automatic transmission that automatically shifts a transmission of a driving force of a motor in response to a driving state and includes: a rotary shaft; a plurality of gear pairs provided on the rotary shaft; a synchromesh mechanism configured to couple the gear pairs and the rotary shaft to transmit the driving force of the motor to the gear pairs; and a switching apparatus configured to apply a load to the synchromesh mechanism by an actuator to switch a coupling state of the gear pairs and the rotary shaft when a shift transmission request is detected, the control device comprising:
   a preload control unit configured to operate the switching apparatus to apply a preload to the synchromesh mechanism when the shift transmission request is detected; and
   a shift control unit configured to operate the switching apparatus to apply a shift load greater than the preload to the synchromesh mechanism after the preload is applied to the synchromesh mechanism;
   wherein the preload is applied to the synchromesh mechanism for a predetermined time period from a time point at which the shift transmission request is detected to a time point at which an automatic clutch configured to transmit and interrupt the driving force between the motor and the automatic transmission is released.

2. A control device for an automatic transmission that automatically shifts a transmission of a driving force of a motor in response to a driving state and includes: a rotary shaft; a plurality of gear pairs provided on the rotary shaft; a synchromesh mechanism configured to couple the gear pairs and the rotary shaft to transmit the driving force of the motor to the gear pairs; and a switching apparatus configured to apply a load to the synchromesh mechanism by an actuator to switch a coupling state of the gear pairs and the rotary shaft when a shift transmission request is detected, the control device comprising:
   a preload control unit configured to operate the switching apparatus to apply a preload to the synchromesh mechanism when the shift transmission request is detected;
   a shift control unit configured to operate the switching apparatus to apply a shift load greater than the preload to the synchromesh mechanism after the preload is applied to the synchromesh mechanism; and a clutch stroke detection unit configured to measure a clutch stroke amount of an automatic clutch configured to transmit and interrupt the driving force between the motor and the automatic transmission upon completion of control of applying the preload, and a preload learning unit configured to learn the preload when the clutch stroke amount exceeds a predetermined range so that the clutch stroke amount gets within the predetermined range.

\* \* \* \* \*